US011902912B2

(12) United States Patent
Kalavakuru et al.

(10) Patent No.: US 11,902,912 B2
(45) Date of Patent: Feb. 13, 2024

(54) ADAPTIVE EQUIVALENT ISOTROPICALLY RADIATED POWER (EIRP) FOR MULTI-LINK DEVICES IN A SINGLE REGULATORY SUB-BAND

(71) Applicant: Cisco Technology, Inc., San Jose, CA (US)

(72) Inventors: Sivadeep Reddy Kalavakuru, Akron, OH (US); John Martin Blosco, Norton, OH (US); Fred Jay Anderson, Lakeville, OH (US); Ardalan Alizadeh, Milpitas, CA (US); Gautam D. Bhanage, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/148,651

(22) Filed: Dec. 30, 2022

(65) Prior Publication Data

US 2023/0133225 A1 May 4, 2023

Related U.S. Application Data

(63) Continuation of application No. 17/164,525, filed on Feb. 1, 2021, now Pat. No. 11,564,177.

(51) Int. Cl.
*H04W 52/08* (2009.01)
*H04W 52/34* (2009.01)
*H04W 56/00* (2009.01)
*H04W 52/26* (2009.01)
*H04W 52/24* (2009.01)
*H04W 84/12* (2009.01)

(52) U.S. Cl.
CPC ....... *H04W 52/346* (2013.01); *H04W 52/242* (2013.01); *H04W 52/262* (2013.01); *H04W 56/001* (2013.01); *H04W 84/12* (2013.01)

(58) Field of Classification Search
CPC ..... H04W 72/04; H04W 88/06; H04W 52/42; H04W 16/28; H04W 56/00; H04W 64/00; H04W 76/14; H04W 52/00; H04W 52/10; H04W 52/08; H04W 48/12; H04W 40/20; G01S 15/06; G01S 13/08; G01S 11/00
See application file for complete search history.

(56) References Cited

U.S. PATENT DOCUMENTS 10,136,395 B1 11/2018 Koshy et al.
2014/0294113 A1 10/2014 Shany et al.
(Continued)

FOREIGN PATENT DOCUMENTS

WO WO2020123162 6/2020

*Primary Examiner* — Tu X Nguyen
(74) *Attorney, Agent, or Firm* — Merchant & Gould P.C.

(57) ABSTRACT

Optimal determination of transmit power level for MLDs in A Wireless Local Area Network (WLAN). An AP can establish synchronous downlink multi-link operations with another MLD. A first link and a second link between the AP and the MLD both operate in a same sub-band. The AP can then determine the same power level for both the first link and second link. After establishing the same power level, the AP can then determine a second power level for the first link and a third power level for the second link. The second power level is greater than the third power level. The AP can then provide the second power level for the first link and the third power level for the second link.

15 Claims, 13 Drawing Sheets

(56) References Cited

U.S. PATENT DOCUMENTS

| | | |
|---|---|---|
| 2014/0307704 A1 | 10/2014 | Arogyaswami |
| 2014/0357310 A1 | 12/2014 | Gaal et al. |
| 2018/0035392 A1* | 2/2018 | Patel .................... H04W 52/367 |
| 2020/0059929 A1 | 2/2020 | Jones |
| 2022/0070791 A1* | 3/2022 | Kim .................... H04W 52/146 |
| 2023/0156525 A1* | 5/2023 | Kim ...................... H04W 52/14 |
| | | 370/329 |

* cited by examiner

116a →

Indoor - 5 GHz Domain E — 118a

| PARAMETER | FSTART (MHz) | 5.150 | 5.250 | 5.470 | 5.725 |
|---|---|---|---|---|---|
| | FSTOP (MHz) | 5.250 | 5.350 | 5.725 | 5.850 |
| | UNIT | UNII-1 | UNII-2 | UNII-2-EXT | UNII-3 |
| ANTENNA_GAIN_LIMIT | dBi | 100 | 100 | 100 | 100 |
| CONDUCTED_POUT_LIMIT | dBm | 100 | 100 | 100 | 100 |
| CONDUCTED_PSD_LIMIT | dBm/MHz | 100 | 100 | 100 | 100 |
| EIRP_LIMIT(TPC=Y') | dBm | 23 | 23 | 30 | 100 |
| EIRP_DENSITY_LIMIT (TPC=Y') | dBm/MHz | 10 | 10 | 17 | 100 |

120a

Indoor - 6 GHz Domain E — 118b

| PARAMETER | FSTART (MHz) | 5.925 | 6.425 | 6.525 | 6.875 |
|---|---|---|---|---|---|
| | FSTOP (MHz) | 6.425 | 6.525 | 6.875 | 7.125 |
| | UNIT | UNII-5 | UNII-6 | UNII-7 | UNII-8 |
| ANTENNA_GAIN_LIMIT | dBi | 100 | 100 | 100 | 100 |
| CONDUCTED_POUT_LIMIT | dBm | 100 | 100 | 100 | 100 |
| CONDUCTED_PSD_LIMIT | dBm/MHz | 100 | 100 | 100 | 100 |
| EIRP_LIMIT(TPC=Y') | dBm | 23 | 100 | 100 | 100 |
| EIRP_DENSITY_LIMIT (TPC=Y') | dBm/MHz | 10 | 100 | 100 | 100 |

Indoor - 5 GHz Domain B

| PARAMETER | UNIT | FSTART (MHz) 5.150 | 5.250 | 5.470 | 5.725 |
|---|---|---|---|---|---|
| | | FSTOP (MHz) 5.250 | 5.350 | 5.725 | 5.850 |
| | | UNII-1 | UNII-2 | UNII-2EXT | UNII-3 |
| ANTENNA_GAIN_LIMIT | dBi | 6 | 6 | 6 | 6 |
| CONDUCTED_POUT_LIMIT1 | dBm | 30 | 24 | 24 | 30 |
| CONDUCTED_POUT_LIMIT2 | dBm | 100 | 11+BWdB | 11+BWdB | 100 |
| CONDUCTED_PSD_LIMIT | dBm/MHz | 17 | 11 | 11 | 33 |
| EIRP_LIMIT(TPC='Y') | dBm | 100 | 30 | 30 | 100 |
| EIRP_DENSITY_LIMIT | dBm/MHz | 100 | 100 | 100 | 100 |

Indoor - 6 GHz Domain B

| PARAMETER | UNIT | FSTART (MHz) 5.925 | 6.425 | 6.525 | 6.875 |
|---|---|---|---|---|---|
| | | FSTOP (MHz) 6.425 | 6.525 | 6.875 | 7.125 |
| | | UNII-1 | UNII-2 | UNII-2EXT | UNII-3 |
| ANTENNA_GAIN_LIMIT | dBi | 6 | 6 | 6 | 6 |
| CONDUCTED_POUT_LIMIT1 | dBm | 24 | 24 | 24 | 24 |
| CONDUCTED_POUT_LIMIT2 | dBm | 100 | 100 | 100 | 100 |
| CONDUCTED_PSD_LIMIT | dBm/MHz | 100 | 100 | 100 | 100 |
| EIRP_LIMIT | dBm | 30 | 30 | 30 | 30 |
| *EIRP_DENSITY_LIMIT | dBm/MHz | 5 | 5 | 5 | 5 |

FIG. 1D

ADAPTIVE EQUIVALENT ISOTROPICALLY RADIATED POWER (EIRP) FOR MULTI-LINK DEVICES IN A SINGLE REGULATORY SUB-BAND

CROSS-REFERENCE TO RELATED APPLICATION

The present application is a continuation of U.S. patent application Ser. No. 17/164,525, filed Feb. 1, 2021, titled "Adaptive Equivalent Isotropically Radiated Power (EIRP) for Multi-Link Devices in a Single Regulatory Sub-band", now U.S. Pat. No. 11,564,177, the disclosure of which is incorporated herein by reference in its entirety.
disclosure relates generally to wireless networks.

TECHNICAL FIELD

The present disclosure relates generally to wireless networks.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Some wireless networks can include Multi-Link Devices (MLDs), in which clients and APs can employ (concurrent or inconcurrent) two or more wireless links for downlink and/or uplink signal traffic.

In APs with Multi-Radio MLD architectures, wherein two or more independent radios may be operated concurrently, care must be taken to either assign operating channels in separate Equivalent Isotropically Radiated Power (EIRP) regulated frequency bands, or de-rate the transmit output power of the radios so the Radio Frequency (RF) power is within the regulatory limit. These considerations limit the flexibility of present operating modes, such as Flexible Radio Assignment (FRA). WiFi standard(s) permits multiple radios in the same AP to go on air at the same time in multi-band data aggregation, potentially transmitting to different clients or to the same client. Under such conditions, the current approaches for the application of the power limits at a single AP tend not to ensure EIRP regulations are met.

BRIEF DESCRIPTION OF THE FIGURES

The accompanying drawings, which are incorporated in and constitute a part of this disclosure, illustrate various example of the present disclosure. In the drawings:

FIG. 1C is a table of an implementation of EIRP requirements in accordance with aspects of the present disclosure;

FIG. 1D is a table of an implementation of EIRP requirements in accordance with aspects of the present disclosure;

DETAILED DESCRIPTION

Overview

Figure 1A:
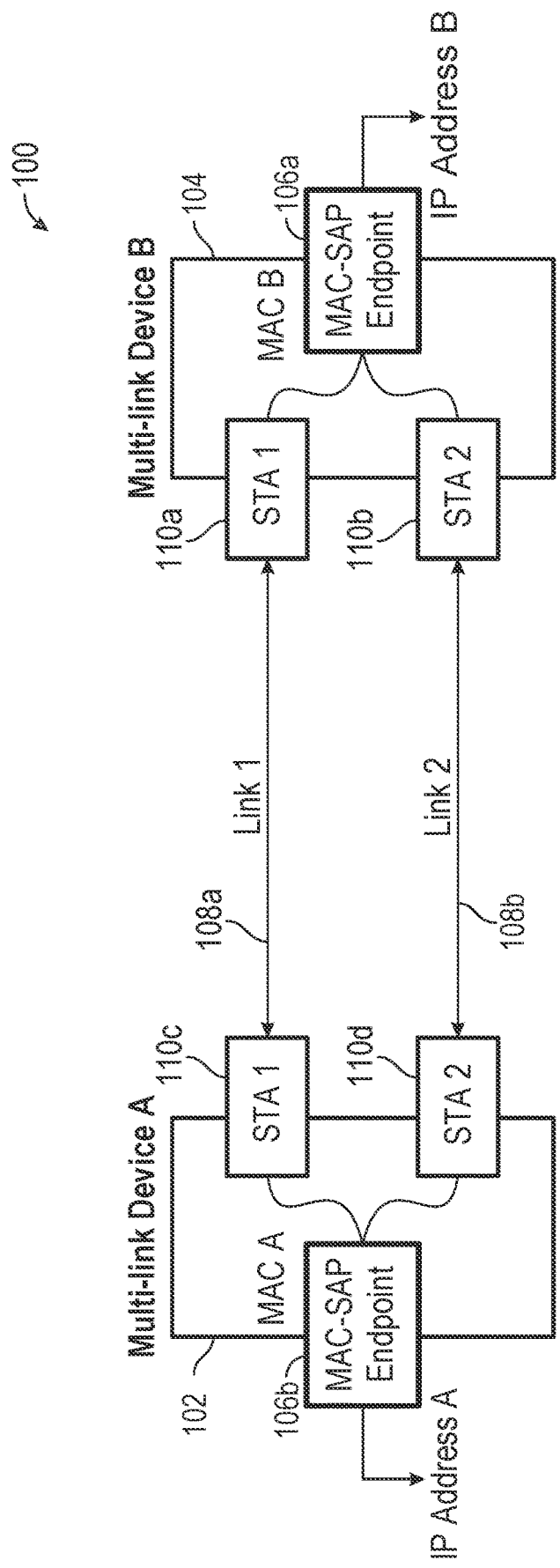
FIG. 1A is a block diagram of wireless network environment in accordance with aspects of the present disclosure.

Optimal determination of transmit power level for MLDs in a Wireless Local Area Network (WLAN). An AP can establish synchronous downlink multi-link operations with another MLD. A first link and a second link between the AP and the MLD both operate in a same sub-band. The AP can determine the same power level for both the first link and second link. After establishing the same power level, the AP can then determine a second power level for the first link and a third power level for the second link. The second power level is greater than the third power level. The AP can then provide the second power level for the first link and the third power level for the second link.

Both the foregoing overview and the following description are examples and explanatory only, and should not be considered to restrict the disclosure's scope, as described and claimed. Furthermore, features and/or variations may be provided in addition to those described. For example, examples of the disclosure may be directed to various feature combinations and sub-combinations described in the implementations.

Example

The following detailed description refers to the accompanying drawings. Wherever possible, the same reference numbers are used in the drawings and the following description to refer to the same or similar elements. While example (s) of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

One of the advancements in Wi-Fi is support of multi-link operations, which is favorable for both tremendous data rates and extremely low latency. Newer Wi-Fi standards have discussed two modes of multi-link operation, referred to as restricted and dynamic link switch. In the restricted mode, data frames and Acknowledgements (ACKs) are bound to one link. Management exchanges ate transmitted over another link, such as related to power save mode, security key negotiation, Block ACK (BA) negotiation, etc. In the dynamic link switch mode, multiple links can be used for transmission of the same flow.

Also, two types of channel access may be possible, asynchronous and synchronous multi-links. The asynchronous multi-link may include overlap of transmissions, but the reception may suffer from interference between radios. To address this interference issue, in addition to the asynchronous multi-link operation, synchronous transmissions may also be included in the flow. Synchronous multi-link operation avoids these problems at the cost of reduced throughput. If both radios work in the same band, the inter-radio interference can be similar to the normal interference from a rogue AP.

EIRP describes the total RF power radiated by an antenna. Federal Communications Commission (FCC) and European Telecommunications Standards Institute (ETSI) have mandated certain total EIRP per "intentional radiator" in each sub-bands. The mandate can be translated to a maximum transmit power (in dB or Watts) based on: the type of antenna (directional or non-directional with less than a 6 dB gain); the frequency band (UNII #); and whether the AP is in an outdoor or indoor deployment. The FCC terminology of "Intentional Radiator" is the transmitter power of the wireless equipment, such as a wireless AP, router, or bridge.

Aspects herein can provide a mechanism for allocating transmit power across co-located radios operating on the same sub-band on the AP. MLD's co-located radios may be on same sub-band (Dual/Tri-5G/6G radios with 100 MHz separation to maintain good Radio Frequency (RF)/Antenna (Ant) (RF/Ant) isolation). In these implementations, the systems and methods can provide adaptive EIRP within certain regulatory limit(s).

As stated before, to achieve better performance, Wi-Fi standards can allow sending packets concurrently on multiple channels. Channels can occupy either different bands or the same band. The multiple channels in the same band can advantageously employ processes, for example, asynchronous channel access, power save mode, etc. The multi-link operation can aggregate a various number of links of different widths, e.g., 160 MHz+20 MHz as explained previously, implementations herein can involve synchronous downlink multi-link operations where the both links are operating in the same sub-band.

Assigning antenna power in situations with synchronous downlink multi-link operations where the both links are operating in the same sub-band may follow one or more of the following processes. In a first process, the assignment of antenna power may be based on the Modulation and Coding Scheme (MCS) of the multiple links. First, the frequency, rate, and/or bandwidths can already have been selected by Radio Resource Management (RRM). Next, the AP can determine an initial power for the multiple links by dividing max EIRP allowance equally between two links and then lowering the power for each link by 3 dB. Then, the AP can consider a 1.5 dB higher transmit power when the MCS increases by one. Therefore, a simple linear translation between the relative MCS of two links and power can be considered. Finally, the AP can calculate the MCS difference, of a first link and a second link, of the multiple links. The AP may then apply the power difference on the links according to the following algorithms:

$$L1\_power\_dB = EIRP\_max\_dB - 3dB + (M1-M2) \times 1.5dB$$

$$L2\_power\_dB = EIRP\_max\_dB - 3dB - (M1-M2) \times 1.5dB$$

In the above equations, M1 and M2 are the MCS of the first link and the second link, respectively.

A second process can involve multi-radios per Basic Service Set (BSS) APs. In these scenarios, the client devices may be distributed randomly, at varying distances, from the cell center and/or AP. The client devices can be separated into near and far groupings. In situations where simultaneous downlink transmissions may be made in both links, a higher RF power may be assigned to the transmissions to client(s) in the far grouping, and a lower RF power may be assigned to the client(s) in the near grouping. For example, a higher RF power, for the far grouping, may be 1 dB lower than regulatory maximum, and a lower RF power, for the near grouping, may be 7 dB lower than the regulatory maximum, such that the total RF power for both groups is less than or equal to the regulatory maximum. This process allows for maximum flexibility in MCS selection, maintenance of good link quality, but at a modest expense of scheduling latency. When the scheduler does not need to schedule simultaneous transmissions, no RF power pullback is necessary on the individual transmissions.

In a third process, the AP can try to equalize the links in terms of path loss. Therefore, the AP can calculate the path loss factor, associated with frequency separation, and the AP can compensate for the path loss based on the following procedure. First, the AP can start transmitting by dividing the power equally between the two or more links, for example, provide power that is 3 dB lower per link. Then, the AP can determine the free space path loss based on a distance between client STAtions (STAs) and the AP by calculating the following algorithm:

$$Path\_loss\_dB = 20 \times \log 10(d) + 20 \times \log 10(f) - 147.55$$

In the above algorithm, d is distance between the AP and the STA, in meters, and f is the servicing frequency in Hz. It may not be necessary to identify distance and calculate the entire path loss.

To provide equal performance in both links, the AP can compensate for the effect of path loss because of frequency separation. For example, the first channel, ch1, may be in band 6.875 GHz, and the second channel, ch2, may be in band 6.525 GHz. The path loss difference can then be based on the following algorithm:

$$20*\log 10(6.875e9) - 20 \log 10(6.525e9) = 0.45384$$

Finally, the AP can determine the final transmit powers based on the following algorithms:

$$L1\_power\_dB\_in\_f1 = EIRP\_max\_dB - 3dB + 20*\log 10(f1/f2)$$

$$L2\_power\_dB\_in\_f2 = EIRP\_max\_dB - 3dB + 20*\log 10(f2/f1)$$

In a final process, the methods above may be combined with antenna selection methods. Combining an antenna power determination method above and an antenna selection method can be considered for a subset of antennas per link with no antenna overlap. For example, if a first link requires 3 dB more power, the AP can give a second link half of the number of antennas assigned to the first link. Further, there can be some antennas shared (overlapped) between the first and second links. In these situations, the AP may keep the overlapped antennas minimized to reduce the inter-path loss due to reflection in RF combiner.

Finally, the one or more of the methods above may include a trigger mechanism. For example, an AP can receive a client request for band aggregation that acknowledges a multi-radio client architecture. In these circumstances, the primary radios can initiate the aggregation and triggers the other radios.

A wireless environment 100 may be as shown in FIG. 1A. The wireless environment 100 can include a WLAN, which may be referred to as WLAN 100, network 100, wireless environment 100, etc., and which can include one or more APs 102. The wireless environment 100 shows just a single AP 102, but the wireless environment 100 can include two or more APs 102. The APs 102 can communicate with each other to conduct operations in concert.

The APs 102 may be in communication with one or more clients 104, which may also be referred to simply as devices 104 or STAs 104. The clients 104 may be physically dispersed through a physical area covered by APs 102 of the WLAN 100. The clients 104 and the APs 102 may be wireless devices, as described in conjunction with FIG. 8B and may be computing systems, as described in conjunction with FIG. 8A. The network 100 can be controlled by a controller (not shown), e.g., a Wireless LAN Controller (WLC), a network controller, etc. The controller may be a computer system, wireless device, and/or another device, as described in conjunction with FIGS. 8A and 8B.

As stated above and as shown in FIG. 1A, the wireless network 100 may comprise Wi-Fi APs 102 that may be configured to support a wireless (e.g., Wi-Fi) network 100. The APs 102 may comprise a physical location where a user, operating a client 104, may obtain access to a wireless network 100 (e.g., Internet access), using Wi-Fi technology, via a WLAN using a router connected to a service provider.

In another example(s) of the disclosure, rather than APs 102, devices may be used that may be connected to a cellular network that may communicate directly and wirelessly with end use devices (e.g., a client 104 device) to provide access to wireless network 100 (e.g., Internet access). For example, these devices may comprise, but are not limited to, eNodeBs (eNBs) or gNodeBs (gNBs). The aforementioned cellular network may comprise, but is not limited to, a Long Term Evolution (LTE) broadband cellular network, a Fourth Generation (4G) broadband cellular network, or a Fifth Generation (5G) broadband cellular network, operated by a service provider. Notwithstanding, example of the disclosure may use wireless communication protocols using, for example, Wi-Fi technologies, cellular networks, or any other type of wireless communications.

Client station devices 104 may comprise, but are not limited to, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network or a cellular network.

The elements described above of the wireless network 100 (e.g., WLC, AP 102, client devices 104, etc.) may be practiced in hardware, in software (including firmware, resident software, micro-code, etc.), in a combination of hardware and software, or in any other circuits or systems. The elements of wireless network 100 may be practiced in electrical circuits comprising discrete electronic elements, packaged or integrated electronic chips containing logic gates (e.g., Application Specific Integrated Circuits (ASIC), Field Programmable Gate Arrays (FPGA), System-On-Chip (SOC), etc.), a circuit utilizing a microprocessor, or on a single chip containing electronic elements or microprocessors. Furthermore, the elements of wireless network 100 may also be practiced using other technologies capable of performing logical operations such as, for example, AND, OR, and NOT, including but not limited to, mechanical, optical, fluidic, and quantum technologies. As described in greater detail below with respect to FIGS. 8A and 8B, the elements of wireless network 100 may be practiced in a computing device 800 and/or wireless device 830.

As explained above, the wireless environment 100 may include one or more APs 102. The APs 102 may be in communication with one or more client devices 104. Both the AP 102 and client device 104 may be a Multi-Link Device (MLD). The MLD 102/104 can communicate contemporaneously over two or more links 108a, 108b. Each device 102, 104 may configure a separate link 108 from each radio, shown as stations 110a-110d. Thus, a first link 108a may communicate between station 110c, at the AP MLD 102, to station 110a, at the client MLD 104. The second link 108b may communicate between the second station 110d, at the AP MLD, to a second station 110b, at the client device 104. The data received at the device 102/104 from the two links 108a, 108b may be consolidated by a Media Access Control (MAC)—Single Access Point (SAP) (MAC-SAP) endpoint 106a, 106b. As such, while the data may be received across two links, the MAC-SAP 106 can provide a single stream of data to the Internet Protocol (IP) address for the AP 102 or the client device 104.

The MLDs 102, 104 may operate in two possible modes of multi-link operations, referred to as a restricted link switch and a dynamic link switch. In the restricted mode, data frames and ACKnowledgements (ACKs) are bound to one link, e.g., link 108a. Management exchanges transmitted over one link 108a, for example, related to power save mode, security key negotiation, Block ACK (BA) negotiation, etc., apply only to this one link 108a. Data is sent over the second link 108b. In the dynamic link switch mode, multiple links 108a and 108b can be used for transmission of the same flow, whether management signals or data.

Figure 1B:
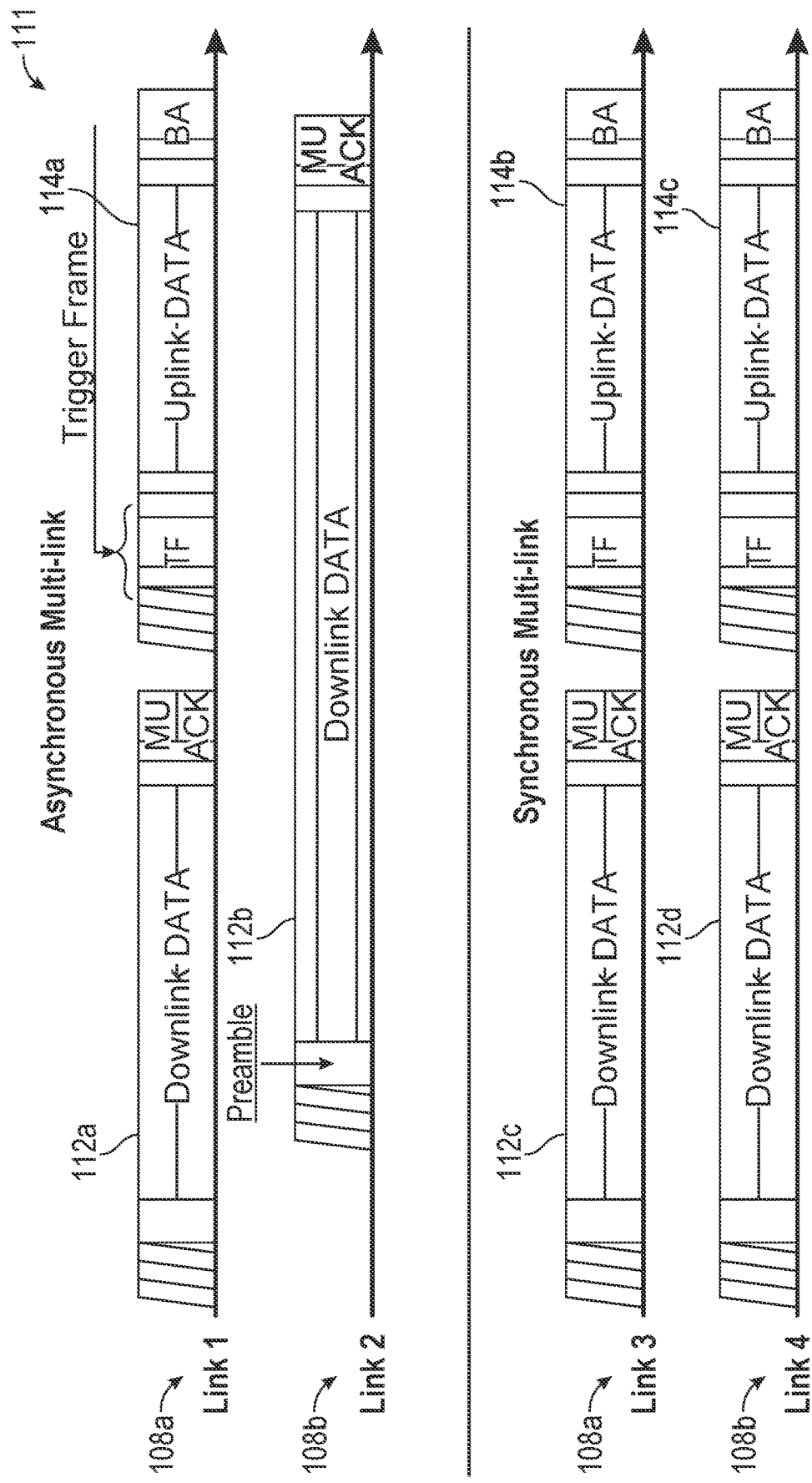
FIG. 1B is a signaling or signpost diagram of a signaling process for Multi-link transmissions in accordance with aspects of the present disclosure.

An implementation of a signaling process 111 may be as shown in FIG. 1B. Two different signaling processes 111, for conducting Multi-Link communications, may be as shown in FIG. 1B. In a first type of communication protocol, the multiple links 108a, 108b, may be used for asynchronous Multi-Link traffic. In this situation, one link 108a may be used for downlink data 112a that is not in sync with a second set of downlink data 112b being sent on the second link 108b. Further, downlink data on the second link 108b may be sent during an uplink transmission 114 on the first link 108a, and vice versa.

In contrast, a second procedure may include synchronous multi-link operations, as shown at the second bottom portion of FIG. 1B. In this situation, both links 108b and 108a may send synchronous transmissions of downlink data 112c through 112d or synchronous transmissions of uplink data 114b, 114c. Either of these type of multi-link operations may be used by the devices 102/104 of FIG. 1A.

An implementation of two tables 116a, 116b, representing requirements in two different country domains, and indicating the EIRP limits, may be as shown in FIG. 1C and FIG. 1D. Table 116a may provide information for a first country domain, while the table 116b provides for the second country domain. The tables portions 118a-118d show the EIRP limits 120a-120d, in the rows of these tables, which indicate the allowed radiated RF power for a link with a client in the respective frequency band and sub-band. Thus, if a MLD is using both links in the same sub-band, as shown in FIG. 1A, those combined sub-band links 108 must not cross the EIRP limits threshold 120 shown in these tables 116.

Figure 1E:
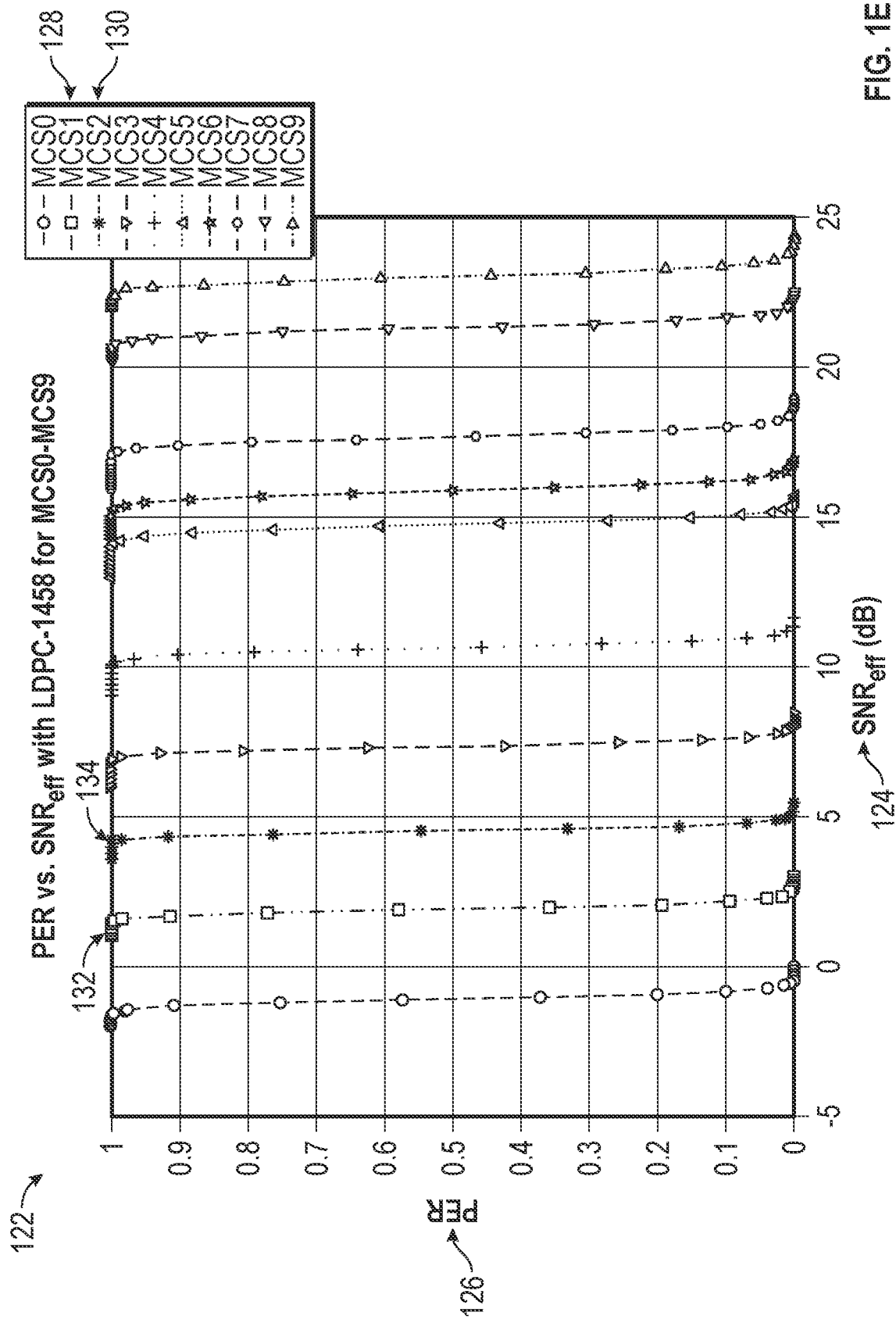
FIG. 1E is a diagram of Packet Error Rates (PER) versus Signal to Noise Ratio (SNR) in accordance with aspects of the present disclosure.

An implementation of a graph showing the linear relationship between the Modulation Coding Scheme (MCS) and the extra RF power needed may be as shown in FIG. 1E. In the graph 122, the Packet Error Rate (PER) 126 is provided on the vertical axis. The Signal-to-Noise Ratio (SNR) 124 may be as provided on the horizontal axis. Several different MCSs can be provided in the chart, including MCS1 128, related to data 132, and MCS2 130, related to data 134. As can be seen, a change in MCS has a linear relationship to the increase in dB needed for RF power along axis 124. In an example, the relationship between MCS to RF power is 1.5 dB.

Figure 2:
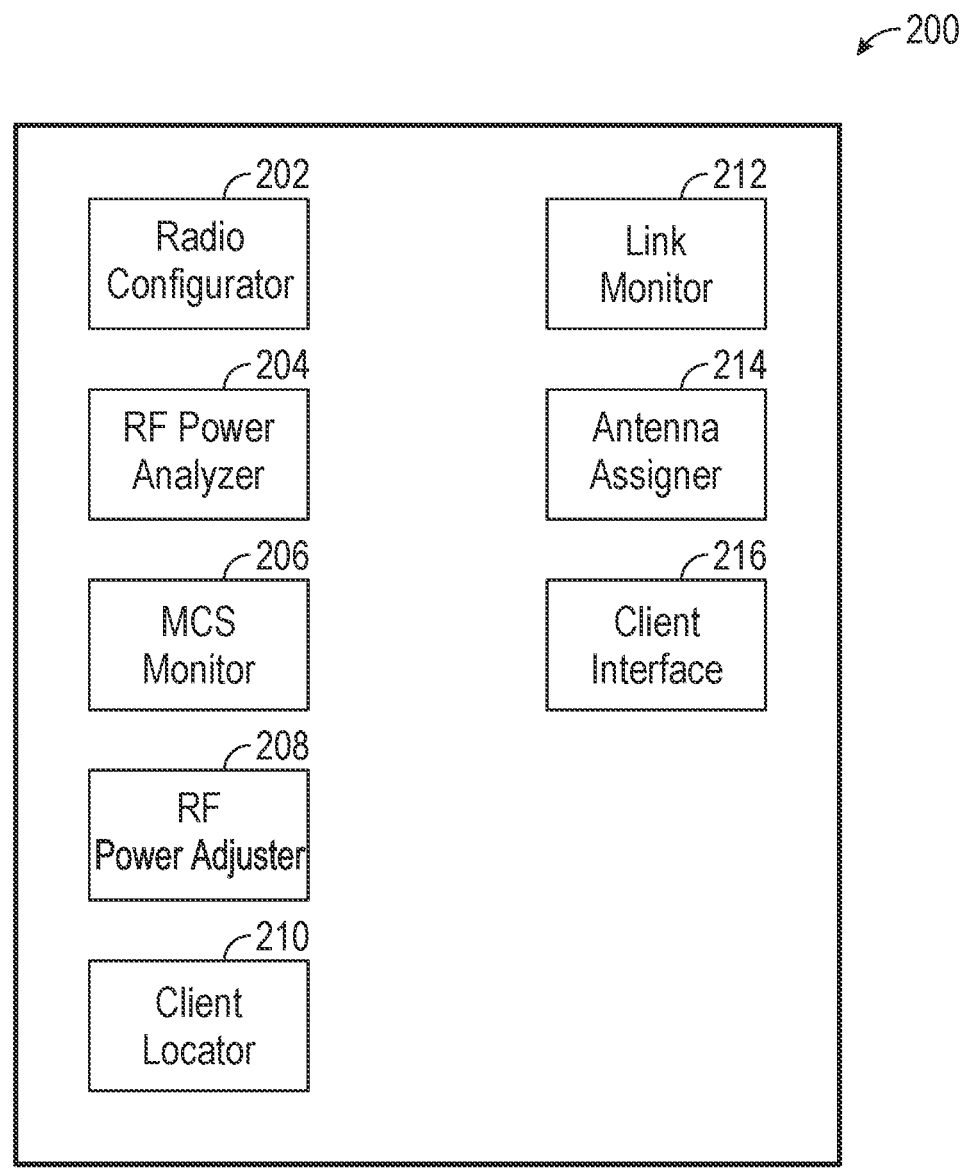
FIG. 2 is a block diagram of AP components in accordance with aspects of the present disclosure.
Figure 8A:
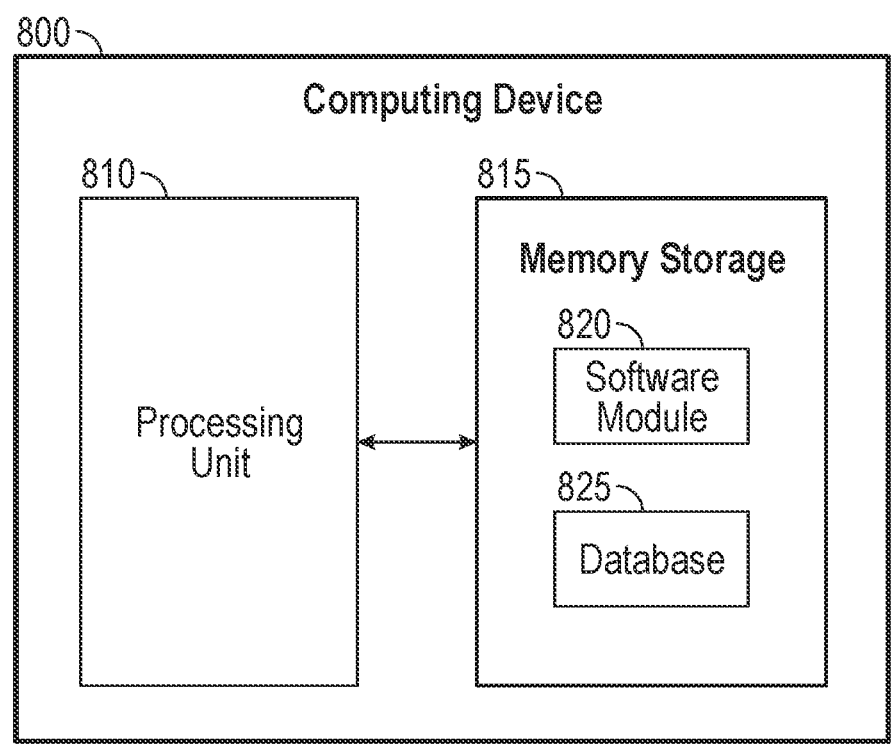
FIG. 8A is a block diagram of a computing device in accordance with aspects of the present disclosure.

An implementation of components 200, associated with the AP 102, for conducting operations contained herein may be as shown in FIG. 2. The APs 102 can include components 200, which may be part of or executed as part of the computing system 800 as is shown in FIG. 8A. These components 200 can include one or more of, but are not limited to, a radio configurator 202, a RF power analyzer 204, a MCS monitor 206, a RF power adjuster 208, a client locator 210, a link monitor 212, an antenna assigner 214, and/or a client interface 216.

The radio configurator 202 can configure the radios/stations 110 of the different links 108. For example, radio configurator 202 can change or modify the stations 110 to conduct link operations 108a, 108b. The radio configurator 202 can establish the link 108, maintains the link 108, monitors the link 108, and compensates for problems with the link 108.

An RF power analyzer 204 can analyze the power being output by any of the stations 110. The RF power analyzer 204 can determine the amount of power being transmitted to or required by one or more clients 104, in connection with the link 108. The information about the RF power can be provided to the RF power adjuster 208.

The MCS monitor 206 may allow the AP 102 (or the client device 104) to determine the Quality Of Service (QOS) being provided by the two or more links 108a, 108b. The MCS monitor 206 can also determine where on graph 122 the currently employed MCS is plotted and whether more power is needed to ensure high QOS. This MCS information may also be provided to the RF power adjuster 208.

The RF power adjuster 208 can determine if the power needs to be adjusted for the one or more of the links 108a, 108b based on the information from the other components 202 through 206. The RF power adjuster 208 can evaluate one or more algorithms, as described hereinafter, to determine the amount of power required by the one or more links 108. Any power adjustments needed by the stations 110 may be instructed by RF power adjuster 208, of the AP 102.

The client locator 210 can locate one or more client devices 104 within a network environment. The client locator 210 can determine a distance from the AP 102 to the client 104. Further, the client locator 210 may be able to determine a physical location for one or more clients and be able to compare the locations of those clients 104 to the AP 102. This distance information may also be provided to the RF power adjuster 208 to determine how to provide power in the one or more links 108 to the client 104.

A link monitor 212 can monitor the one or more links 108 between the AP 102 and the client device 104. The link monitor 212 can determine if there is interference or other issues with the link 108. This link information can also be provided to the RF power adjuster 208 to change the RF power and two improve the QOS of the link 108.

The antenna assigner 214 may be operable to assign one or more antenna elements to stations 110c, 100d. Thus, to produce higher levels of power for one link 108a compared to another link 108b, antenna assigner 214 can change a number of antennas used by one or more of the stations 110. In this way, the RF power adjuster 208 or RF power analyzer 204 may provide information about the power requirements to the antenna assigner 214, which can change the amount of power being transmitted by changing the number of antenna elements provided to the stations 110.

Client interface 216 can interact with the client device 104 to gain information about the performance of the links 108. Further, the client interface 216 may be operable to receive data or information about the client 104, for example, a client's location.

Figure 3:
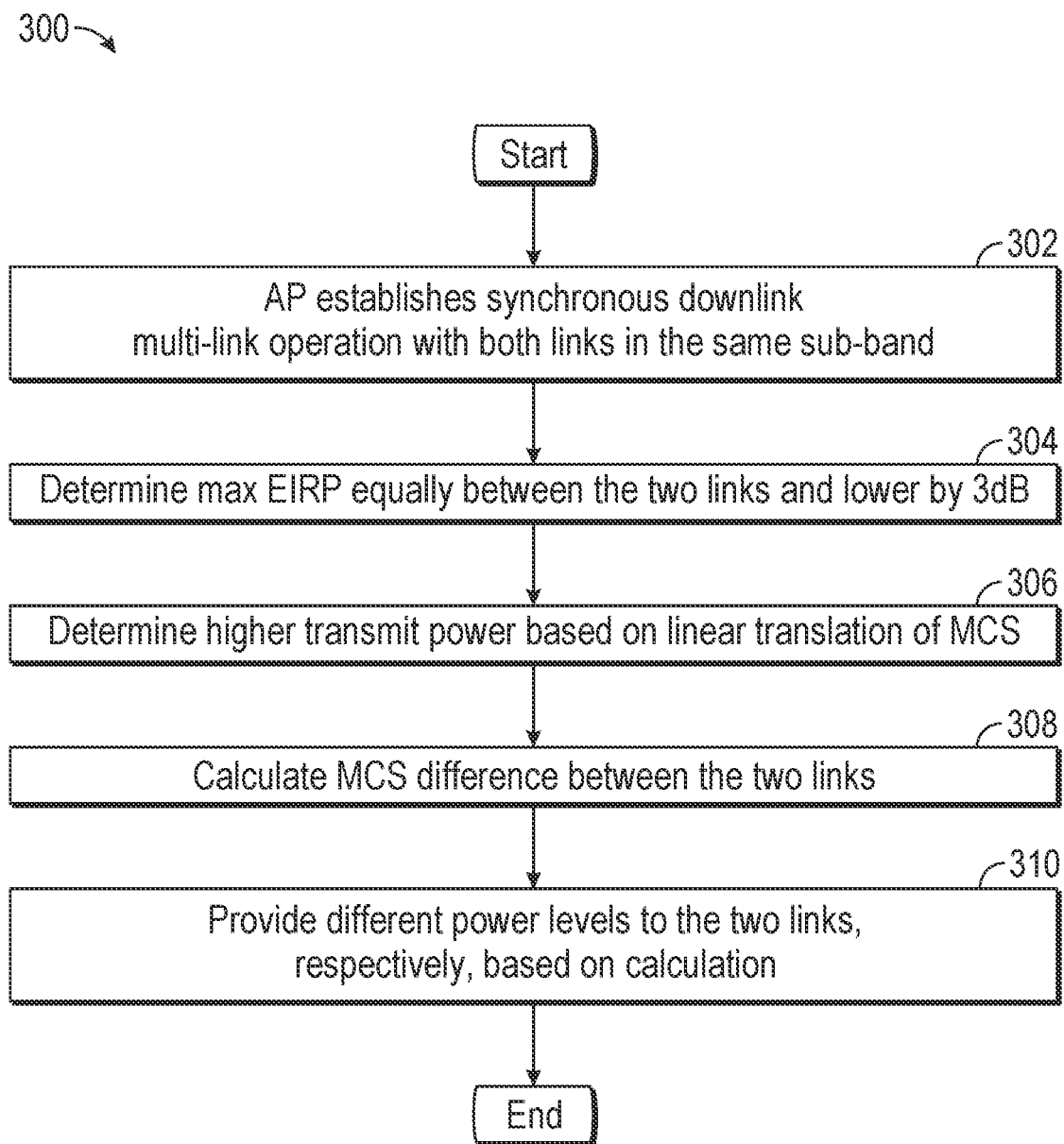
FIG. 3 is a flow chart of a method for determining power levels for transmissions from an AP in accordance with aspects of the present disclosure.

An implementation of a method 300 for establishing RF transmit power levels with a MLD may be as shown in FIG. 3, in accordance with aspects of the disclosure. The method 300 can start with a start operation and can end with an end operation. The method 300 can include more or fewer stages or can arrange the order of the stages differently than those shown in FIG. 3. The method 300 can be executed as a set of computer-executable instructions, executed by a computer system or processing component, and be encoded or stored on a storage medium. Further, the method 300 can be executed by a gate or other hardware device or component in an ASIC, a FPGA, a SOC, or other type of hardware device. Hereinafter, the method 300 shall be explained with reference to the systems, components, modules, software, data structures, etc. described herein.

The AP 102 can establish synchronous downlink multi-link operations, with both the links 108a, 108b transmitting in the same sub-band, in stage 302. In implementations, the radio configurator 202 can establish the links 108a, 108b between stations 110c, 100d, of the AP 102, to the MLD client device 104. The links 108 can each transmit in the same sub-band. For example, link 108a and 108b may be in the same 20 MHz sub-band. Further, the links 108a, 108b can be transmitting in synchronous multi-link operations as described in conjunction with FIG. 1B, where downlink data is sent from the AP 102 as packets 112c and 112d, over links 108a, 108b, at a substantially same time.

The AP 102 can then determine a maximum EIRP power level that can be determined and divided equally between the two links 108a, 108b and lower that Max power on each link 108 by a predetermined amount of power, e.g., 3 dB, in stage 304. The RF power analyzer 204 can determine the maximum EIRP limit from stored information, for example, tables 116a, 116b. The EIRP limit information may be extracted from row 120 and may then be divided equally between the first link 108a and the second link 108b. For example, if the maximum power is 30 dB, the maximum power can be divided into two 15 dB power allotments between the first station 110c and the second station 110d. Then, the RF power analyzer 204 can determine the lower the power allotment below the threshold, for example, by three (3) dB, per link 108. Lowering the RF power by three (3) dB can create a buffer to ensure that the power stays below the maximum threshold for both links 108.

The AP 102 can then dynamically determine a higher transmit power for one of the links 108 based on the linear relationship between the MCS and transmit power (as explained above in conjunction with FIG. 1E), in stage 306. As shown in chart 122, an increase in one level of the MCS roughly relates to an increase of 1.5 dB needed for the output RF power. As such, to adjust dynamically the power between the two links 108a, 108b, the RF power adjuster 208 can determine which link 108 is to have the higher power based on the MCS of each link 108a, 108b. For example, if link1 108a is operating on MCS3, then link1 108a should have a higher power output level than the second station 110d and link 108b, if that second link 108b is operating on MCS1, for example. This MCS information may be used in the calculation described below.

The AP 102 can calculate the MCS difference between the two links 108a, 108b, in stage 308. The MCS monitor 206 can determine MCS level for each link 108a, 108b. Then, based on the MCS data, the MCS monitor 206 can determine the difference in MCS levels. For example, the MCS monitor 206 can subtract the MCS1 level from the MCS3 level, from the example described above. In this way, the difference between the MCS levels is two. This difference may then be used to determine which link is allotted a higher power level.

The AP 102 can then provide different power levels to the two links 108a, 108b, respectively, based on a power level calculation, in stage 310. The power level calculations can be as follows:

Link1 Power Level=Max EIRP(dB)−3dB+
  ((*MCS*1level-*MCS*2level)×1.5dB)

Link2 Power Level=Max EIRP(dB)−3dB−
  ((*MCS*1level-*MCS*2level)×1.5dB)

Thus, if the MCS difference is two, from the example above, then an extra 3 dB of power is added to link1 108a, and 3 dB of power is subtracted from link2 108b. These power assignments can thus be based on the MCS of the two links 108. In this way, the link using a higher level MCS, or higher data throughput, gets more RF power allotted.

Figure 4:
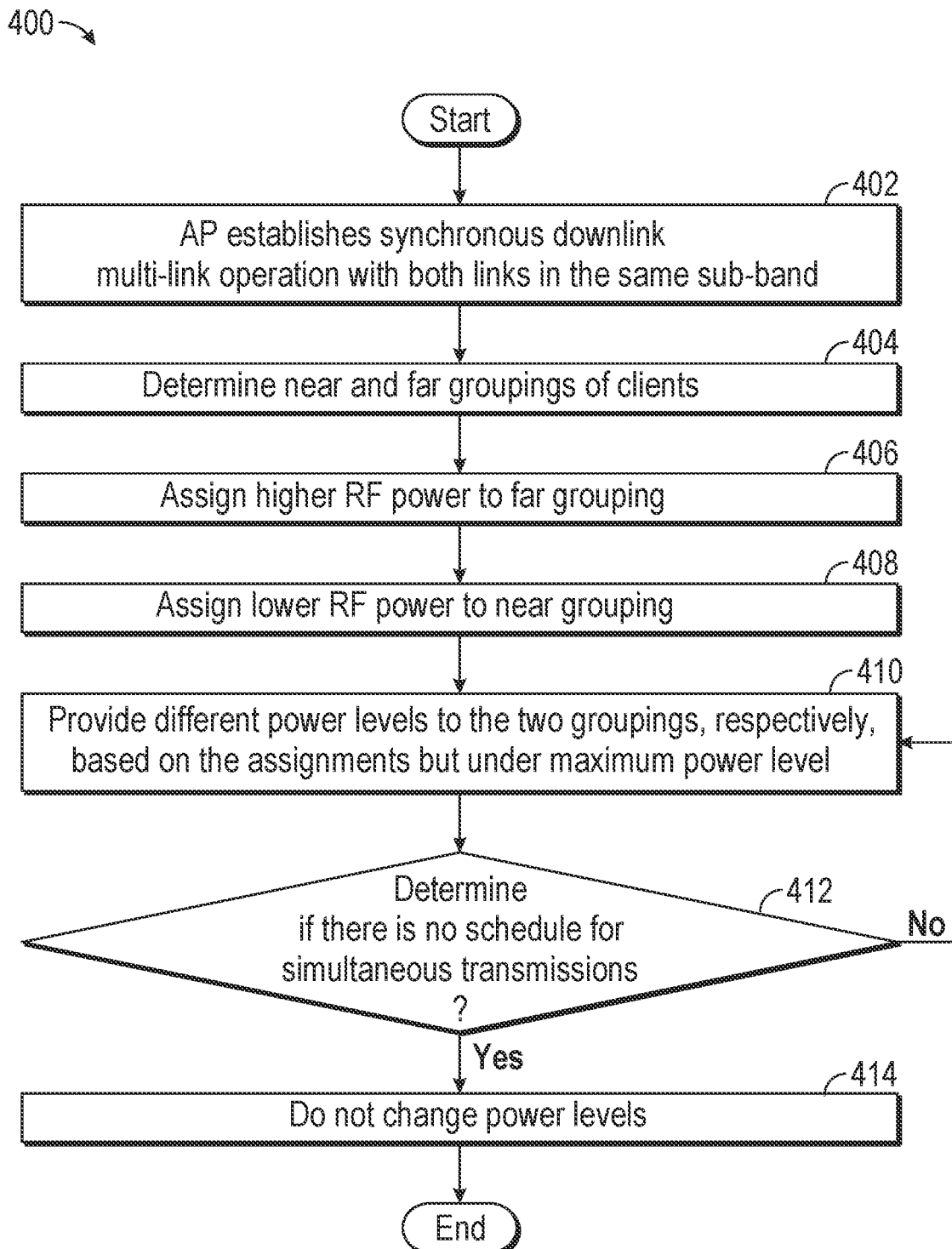
FIG. 4 is another flow chart of another method for determining power levels for transmissions from an AP in accordance with aspects of the present disclosure.

An implementation of a method 400 for adjusting RF power levels based on location groupings may be as shown in FIG. 4, in accordance with aspects of the disclosure. The method 400 can start with a start operation and can end with an end operation. The method 400 can include more or fewer stages or can arrange the order of the stages differently than those shown in FIG. 4. The method 400 can be executed as a set of computer-executable instructions, executed by a computer system or processing component, and be encoded or stored on a storage medium. Further, the method 400 can be executed by a gate or other hardware device or component in an ASIC, a FPGA, a SOC, or other type of hardware device. Hereinafter, the method 400 shall be explained with reference to the systems, components, modules, software, data structures, etc. described herein.

AP 102 can establish synchronous downlink multi-link operations with both links 108 in the same sub-band, in stage 402. The establishment of downlink operations in stage 402 may be the same or similar to the establishment of downlink operations from stage 302. As such, stage 402 will not be explained more here.

The AP 102 can then determine a near grouping and a far grouping of two or more clients 104 in communication and receiving downlink transmissions from the AP 102, in stage 404. The client locator 210 can determine an XY position or a three-dimensional position of each client 104. The location information may be based on soundings or other data provided or determined by the client locator 210. From these location determinations, the client locator 210 can group the clients 104 into either a near grouping or a far grouping. A predetermined threshold may be used to determine into which grouping the clients 104 may be placed. For example, a near grouping may include clients 104 within 50 feet of the AP 102. The far grouping may be greater than 50 feet from the AP 102. In other implementations, the determination of the near and far grouping may be more dynamic. For example, the clients may be split equally into two groups. The group that is closer to the AP 102 may be considered the near grouping, and the rest of the clients 104 may be in the far grouping, where the boundary between the near and far groupings may be variable.

The AP 102 can then assign a higher RF power allotment to the far grouping, in stage 406. The RF power adjuster 208 can assign higher RF power to the far grouping. For example, the power allotted to the far grouping may be one dB lower than the maximum EIRP limit, as provided in tables 116. The higher RF power can be equal to any number of decibels below the regulatory maximum.

The AP 102 can also allot a lower RF power allotment to the near grouping, in stage 408. The RF power adjuster 208 can calculate a lower RF power for the near grouping. A lower RF power may be, for example, 7 dB lower than the EIRP limit in tables 116. Regardless of the regulatory maximum power, the higher RF power calculated in stage 406 is greater than the lower RF power calculated in stage 408. The amount of decibels below the regulatory maximum may be predetermined or adjusted for both the higher RF power and the lower RF power. The higher RF power and lower RF power, when summed together, is less than or equal to the regulatory maximum EIRP limit. Thus, the number of decibels below the regulatory maximum, for each the higher RF power output and the lower RF power output, may be adjusted to ensure the total RF power output is below the regulatory maximum EIRP limit.

The AP 102 may then provide the different power levels to the two location groupings, based on the assignments from stages 406 and 408, to ensure the total maximum power level for both links 108 is below the regulatory maximum, in stage 410. The RF power adjuster 208 can adjust the RF power output from the stations 110a, 100b, operating on links 108a, 108b. It should be noted that this type of power allotment allows for maximum flexibility in the MCS selection while maintaining good quality for the link 108 with only a small amount of extra scheduling latency.

The AP 102 can then determine if there is no schedule for simultaneous downlink transmissions, in stage 412. If there is a scheduled simultaneous transmission, the method 400 may proceed "NO" back to stage 410 to dynamically adjust the RF power for the links 108. However, if there is no simultaneous transmission scheduled, the method 400 may proceed "YES" to stage 414. In stage 414, the RF power outputs are not adjusted by the AP 102. In this way, the RF power outputs are adjusted when needed for simultaneously downlink transmissions over the same sub-band.

Figure 5:
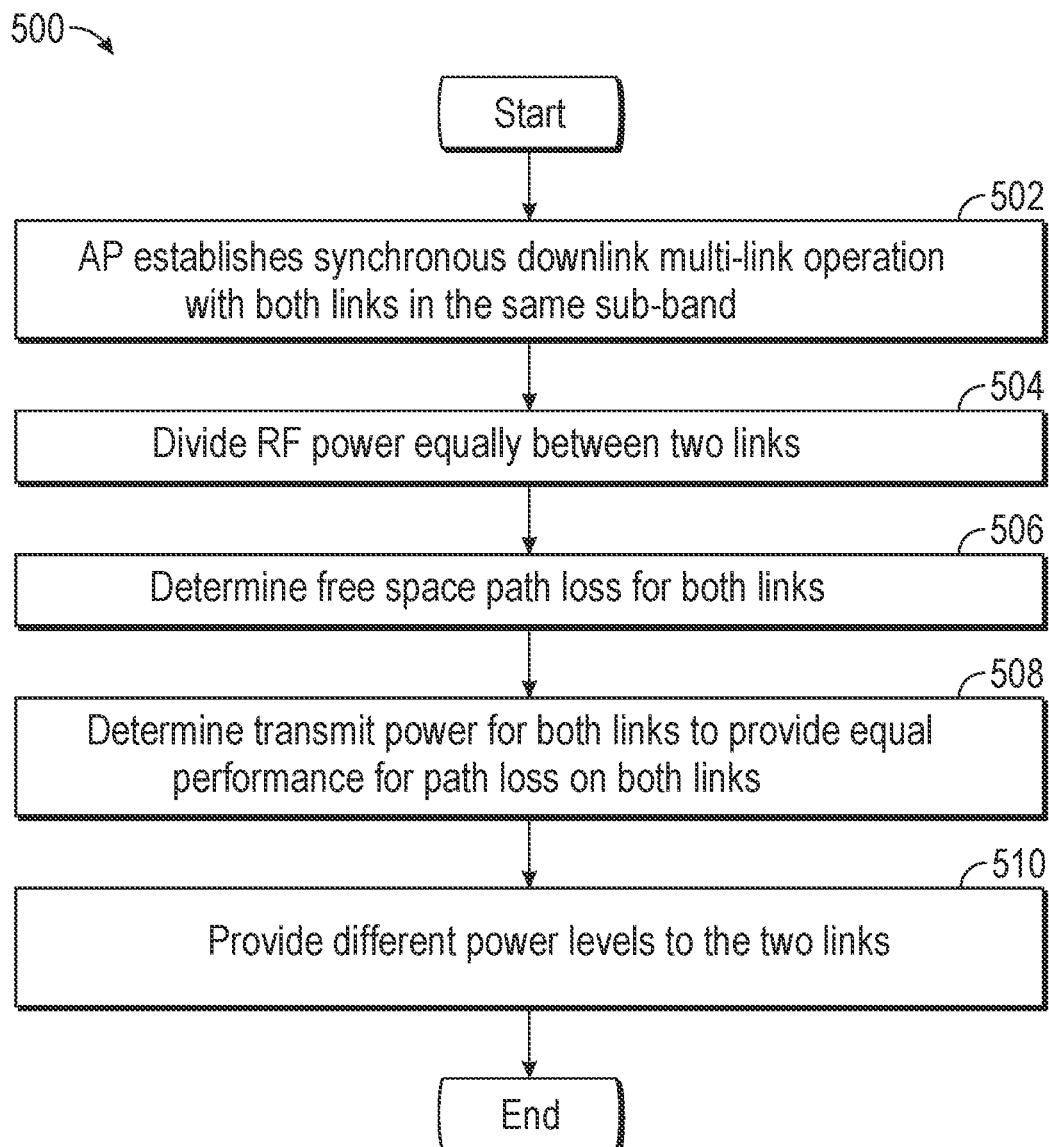
FIG. 5 is another flow chart of another method for determining power levels for transmissions from an AP in accordance with aspects of the present disclosure.

An implementation of a method 500 for determining power levels based on the free space path loss may be as shown in FIG. 5, in accordance with aspects of the disclosure. The method 500 can start with a start operation and can end with an end operation. The method 500 can include more or fewer stages or can arrange the order of the stages differently than those shown in FIG. 5. The method 500 can be executed as a set of computer-executable instructions, executed by a computer system or processing component, and be encoded or stored on a storage medium. Further, the method 500 can be executed by a gate or other hardware device or component in an ASIC, a FPGA, a SOC, or other type of hardware device. Hereinafter, the method 500 shall be explained with reference to the systems, components, modules, software, data structures, etc. described herein.

An AP 102 can establish downlink multi-link operations where both links 108 are transmitting in the same sub-band, in stage 502. Stage 502 is substantially similar to stage 302 of FIG. 3 and will not be explained further here.

The AP 102 can divide RF power equally between the two links 108a, 108b, in stage 504. Thus, the radio configurator 202 can establish downlink operations, and the RF power adjuster 208 can equally divide the RF power based on the EIRP max between the two links 108a, 108b. For example, if the max RF power, as determined by the EIRP limit, is 30 dB, then the RF power adjuster 208 can allot 15 dBs of RF power to each station 110c, 110d.

AP 102 can then determine the free space path loss for both links 108a, 108b, in stage 506. The link monitor 212 can determine the free space path loss. The free space path loss, between the station 104 and AP 102, can be determined by evaluating one or more algorithms. One example of an algorithm that may determine the free space path loss can be as following:

$$\text{Path Loss(dB)} = 20 \times \log 10(d) + 20 \times \log 10(f) - 147.55$$

Thus, by knowing the distance (d) from the AP 102 to the client 104, based on the location determination by the client locator 210, and the frequency (f) being used by the links 108, the free space path loss can be determined by the link monitor 212.

The AP 102 can then dynamically determine the transmit power for both links 108a, 108b to provide equal performance based on path loss, in stage 508. To provide the equal performance in both links 108, the link monitor 212 has to compensate for the path loss due to frequency separation. The determination of the RF power can be a measure based on the frequency of each link 108. For example, the link 108 power can be determined based on the following equations:

$$\text{Link1Power(dB)} = \text{Max EIRP(dB)} - 3\text{dB} + 20 * \log 10(\text{frequency of link1/frequency of link2})$$

$$\text{Link2Power(dB)} = \text{Max EIRP(dB)} - 3\text{dB} + 20 * \log 10(\text{frequency of link2/frequency of link1})$$

These two equivalent algorithms provide different transmit powers for both links 108a, 108b. The difference in RF output power for the links 108a, 108b is based on the frequency of the links 108a, 108b.

The AP 102 may then change or provide different power levels to the two links 108a, 108b based on the calculations from stage 508, in stage 510. The RF power adjuster 208 can assign the power levels to stations 110c, 110d.

Figure 6:
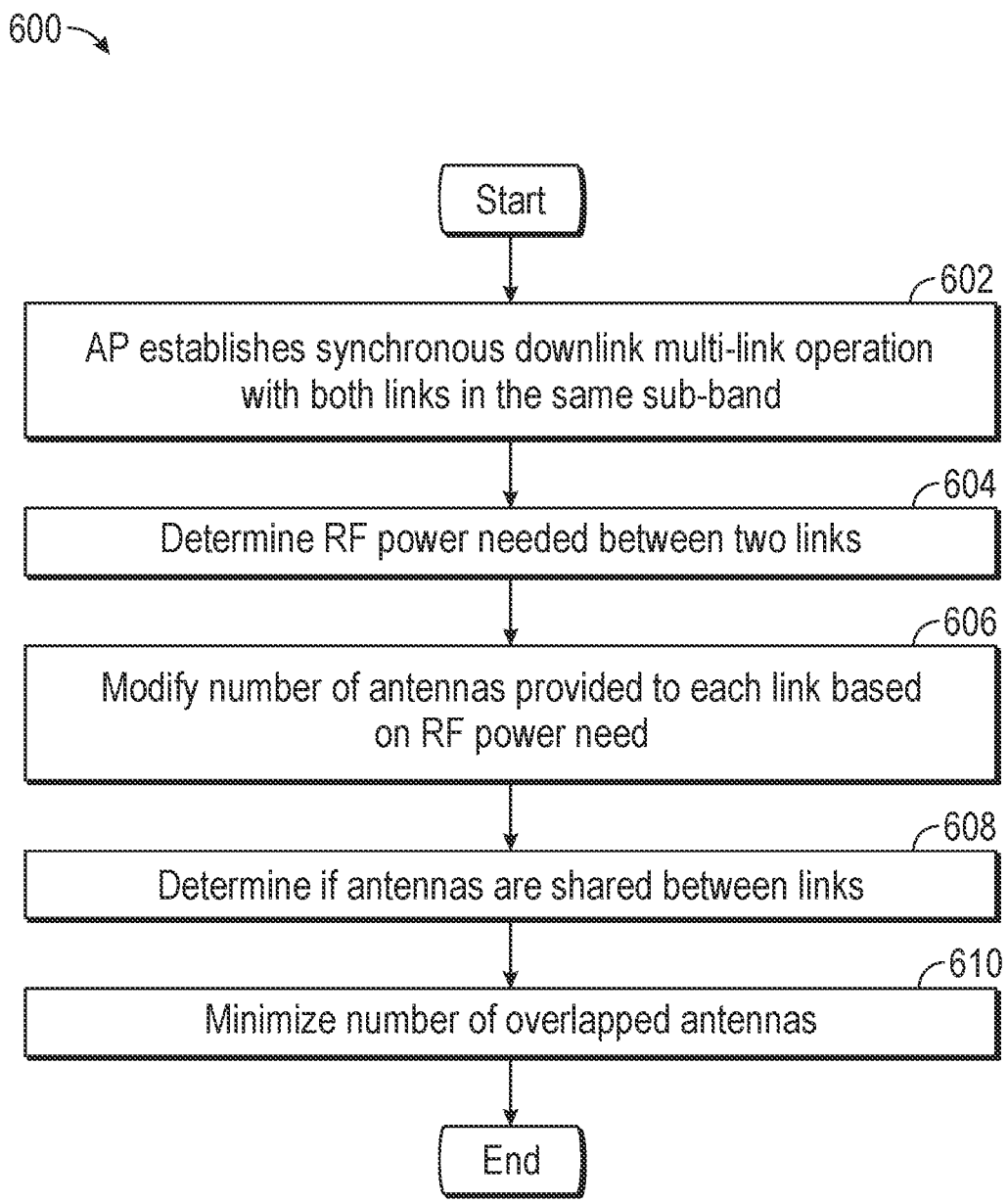
FIG. 6 is another flow chart of another method for determining power levels for transmissions from an AP in accordance with aspects of the present disclosure.

An implementation of a method 600 for determining and providing a different number of antennas to different links to provide different power levels may be as shown in FIG. 6, in accordance with aspects of the disclosure. The method 600 can start with a start operation and can end with an end operation. The method 600 can include more or fewer stages or can arrange the order of the stages differently than those shown in FIG. 6. The method 600 can be executed as a set of computer-executable instructions, executed by a computer system or processing component, and be encoded or stored on a storage medium. Further, the method 600 can be executed by a gate or other hardware device or component in an ASIC, a FPGA, a SOC, or other type of hardware device. Hereinafter, the method 600 shall be explained with reference to the systems, components, modules, software, data structures, etc. described herein.

AP 102 can establish synchronous downlink Multi-link operations where both links 108 are using the same sub-band, in stage 602, which may be the same or similar to stage 302 and will not be explained further here.

The AP 102 can then determine the RF power needed between the two links, in stage 604. Here, the RF power level determination can be made by any of the methods 300 through 500 as provided above in FIGS. 3-5. Thus, the RF power can be determined and provided by the RF power analyzer 204 to the RF power adjuster 208 and/or the antenna assigner 214.

The AP 102 can then modify the number of antennas provided to each link 108 based on the RF power needed, in stage 606. The different power levels for the two stations 110c, 110d can be analyzed to determine the ratio of antennas between the two stations 110 that may be used. The antenna assigner 214 can assign a greater number of antenna elements to the station 110 that requires the higher RF power. The ratio of antennas should be the same or similar to the ratio of RF power required by the two links 108a, 108b. For example, if the RF power required by link1 108a is twice as much as the RF power required by link 108b, the antenna assigner 214 can assign twice as many antenna elements to station 110c as to station 110d. Further, some antennas may be overlap.

AP 102 can determine if any of the antennas are shared between links 108a, 108b, in stage 608. The antenna assigner 214 can determine if antennas are to be shared between the links 108a, 108b. In this way, the shared antennas allow for more fine adjustment of how much power is allotted to the link 108 by the shared antenna elements provided to each station 110.

The AP can also minimize the number of overlapped antennas, in stage 610. Overlapped antennas need to be minimized to reduce inter-path loss due to reflection at the RF combiner. Thus, antenna assigner 214 can determine which antennas are overlapped antennas, but minimize those overlapped antennas as needed by reassigning antenna elements.

Figure 7:
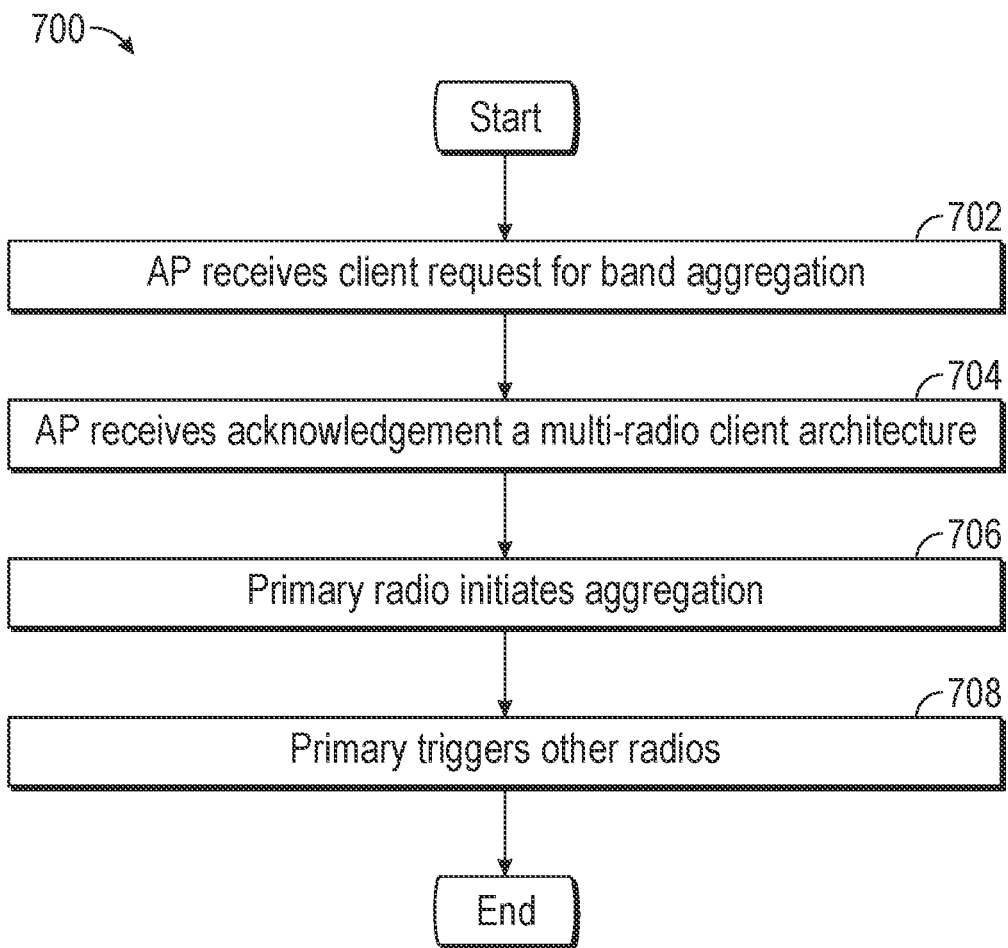
FIG. 7 is a flow chart of a method for radio aggregation in accordance with aspects of the present disclosure.

An implementation of a method 700 for providing a trigger for the above methods may be as shown in FIG. 7, in accordance with aspects of the disclosure. The method 700 can start with a start operation and can end with an end operation. The method 700 can include more or fewer stages or can arrange the order of the stages differently than those shown in FIG. 7. The method 700 can be executed as a set of computer-executable instructions, executed by a computer system or processing component, and be encoded or stored on a storage medium. Further, the method 700 can be executed by a gate or other hardware device or component in an ASIC, a FPGA, a SOC, or other type of hardware device. Hereinafter, the method 700 shall be explained with reference to the systems, components, modules, software, data structures, etc. described herein.

An AP 102 can receive a client request for band aggregation, in stage 702. A client 104 can determine that band aggregation can involve multi-downlink operations where the sub-bands are shared between links 108. The AP 102 can receive such client request at the client interface 216, and the request or other information may then be provided to the radio configurator 202. AP 102 can then receive acknowledgment of a multi-radio client architecture, in stage 704. The client interface 216 can communicate with the client device 104 to determine if the device 104 has the ability for an MLD configuration.

The primary radio initiates aggregation, in stage 706. The radio configurator 202, of the primary radio 110 C, can initiate aggregation with the two links 108a, 108b of the MLD 104 with both links 108a, 108b in the same a sub-band. Upon aggregation of the two links 108a, 108b into the same sub-band, the radio configurator 202 can trigger the other radio 110*d* to change its configuration into the same sub-band, in stage 708. Thus, the primary radio 110*c* can send a message to the radio configurator 202 of the second radio 110*d* to instruct the use of the same sub-band. Upon this trigger happening, the methods described previously can then be triggered to modify dynamically the power output of the two links 108*a*, 108*b*.

FIG. 8A shows computing device 800. As shown in FIG. 8A, computing device 800 may include a processing unit 810 and a memory unit 815. Memory unit 815 may include a software module 820 and a database 825. While executing on processing unit 810, software module 820 may perform, for example, processes for determining antenna power output, as described above with respect to FIGS. 1-7. Computing device 800, for example, may provide an operating environment for the controller, the APs 102, the clients 104, or the other devices, however, the controller, APs 102, the clients 104, and other devices may operate in other environments and are not limited to computing device 800.

Computing device 800 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 800 may comprise any computer operating environment, such as hand-held devices, multiprocessor systems, microprocessor-based or programmable sender electronic devices, minicomputers, mainframe computers, and the like. Computing device 800 may also be practiced in distributed computing environments where tasks are performed by remote processing devices. The aforementioned systems and devices are examples and computing device 800 may comprise other systems or devices.

Figure 8B:
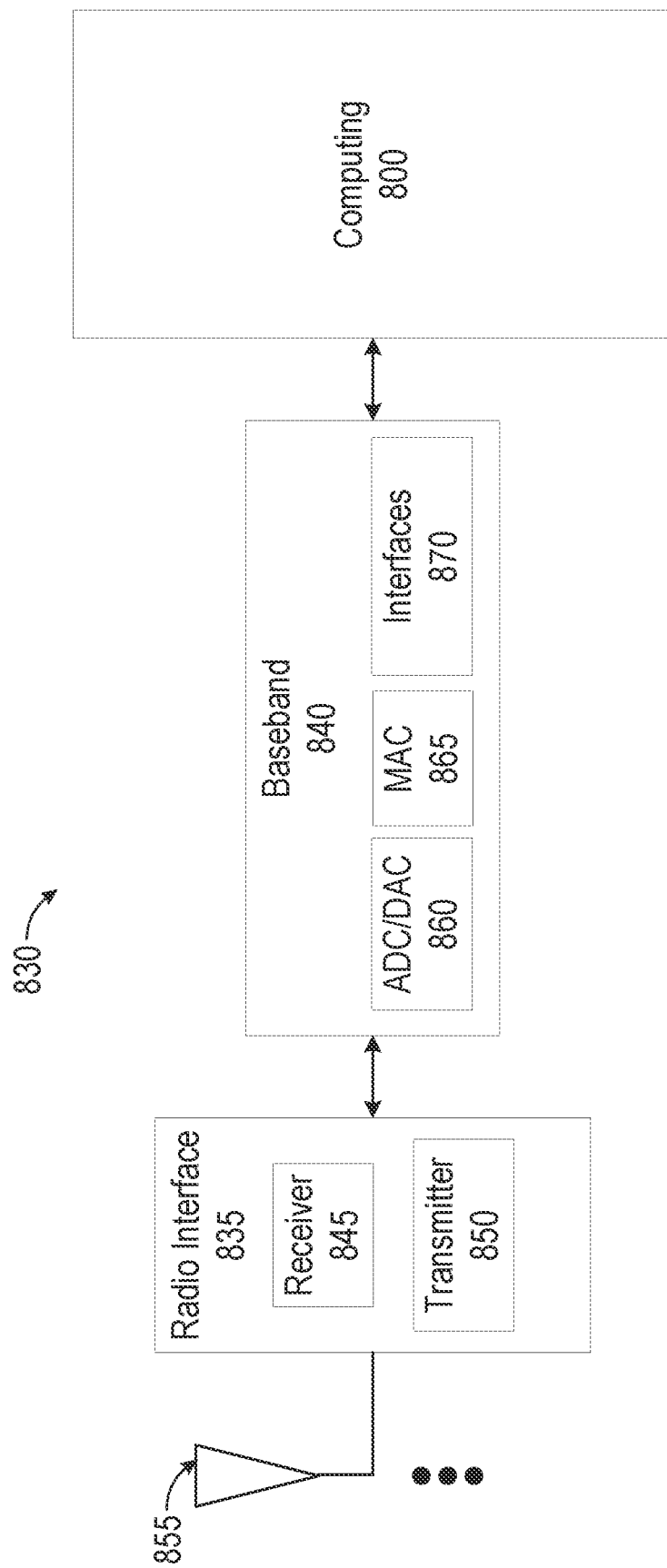
FIG. 8B is a block diagram of a wireless device in accordance with aspects of the present disclosure.

FIG. 8B illustrates an implementation of a communications device 830 that may implement one or more of APs 102, the clients 104, controllers, etc., of FIGS. 1-7. In various implementations, device 830 may comprise a logic circuit. The logic circuit may include physical circuits to perform operations described for one or more of APs 102, the clients 104, controllers, etc., of FIGS. 1-7, for example. As shown in FIG. 8B, device 830 may include one or more of, but is not limited to, a radio interface 835, baseband circuitry 840, and/or computing platform 800.

The device 830 may implement some or all of the structures and/or operations for APs 102, the clients 104, controllers, etc., of FIGS. 1-7, storage medium, and logic circuit in a single computing entity, such as entirely within a single device. Alternatively, the device 830 may distribute portions of the structure and/or operations using a distributed system architecture, such as a client 104-server architecture, a peer-to-peer architecture, a master-slave architecture, etc.

A radio interface 835, which may also include an analog front end (AFE), may include a component or combination of components adapted for transmitting and/or receiving single-carrier or multi-carrier modulated signals (e.g., including Complementary Code Keying (CCK), orthogonal frequency division multiplexing (OFDM), and/or Single-Carrier Frequency Division Multiple Access (SC-FDMA) symbols) although the configurations are not limited to any specific over-the-error interface or modulation scheme. The radio interface 835 may include, for example, a receiver 845 and/or a transmitter 850. Radio interface 835 may include bias controls, a crystal oscillator, and/or one or more antennas 855. In additional or alternative configurations, the radio interface 835 may use oscillators and/or one or more filters, as desired.

Baseband circuitry 840 may communicate with radio interface 835 to process, receive, and/or transmit signals and may include, for example, an Analog-to-Digital Converter (ADC) for down converting received signals with a Digital-to-Analog Converter (DAC) 860 for up converting signals for transmission. Further, baseband circuitry 840 may include a baseband or PHYsical layer (PHY) processing circuit for the PHY link layer processing of respective receive/transmit signals. Baseband circuitry 840 may include, for example, a Medium Access Control (MAC) processing circuit 865 for MAC/data link layer processing. Baseband circuitry 840 may include a memory controller for communicating with MAC processing circuit 865 and/or a computing platform 800, for example, via one or more interfaces 870.

In some configurations, PHY processing circuit may include a frame construction and/or detection module, in combination with additional circuitry such as a buffer memory, to construct and/or deconstruct communication frames. Alternatively or in addition, MAC processing circuit 865 may share processing for certain of these functions or perform these processes independent of PHY processing circuit. In some configurations, MAC and PHY processing may be integrated into a single circuit.

Example of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, example of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a Random Access Memory (RAM), a Read-Only Memory (ROM), an Erasable Programmable Read-Only Memory (EPROM or Flash memory), an optical fiber, and a portable Compact Disc Read-Only Memory (CD-ROM). Node that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain example of the disclosure have been described, other example may exist. Furthermore, although example of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, example of the disclosure may be practiced in an electrical circuit comprising discrete electronic elements, packaged or integrated electronic chips containing logic gates, a circuit utilizing a microprocessor, or on a single chip containing electronic elements or microprocessors. Example of the disclosure may also be practiced using other technologies capable of performing logical operations such as, for example, AND, OR, and NOT, including but not limited to, mechanical, optical, fluidic, and quantum technologies. In addition, example of the disclosure may be practiced within a general purpose computer or in any other circuits or systems.

Example of the disclosure may be practiced via a SOC where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via an SOC, the functionality described herein with respect to example of the disclosure, may be performed via application-specific logic integrated with other components of computing device 800 on the single integrated circuit (chip).

Example of the present disclosure, for example, are described above with reference to block diagrams and/or operational illustrations of methods, systems, and computer program products according to example of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for example of the disclosure.

What is claimed is:

1. A method comprising:
   establishing, by an Access Point (AP), synchronous downlink multi-link operations with a first link that operates in a sub-band and a second link that operates in the sub-band;
   determining, by the AP, a first power level for both the first link and second link;
   determining, by the AP, a second power level for the first link and a third power level for the second link, wherein the second power level is greater than the third power level;
   providing, by the AP, the second power level for the first link and the third power level for the second link,
   determining, by the AP, that a first client, in communication over the first link, is more distant from the AP than a second client, in communication over the second link;
   based on the determination that the first client is more distant, determining that the second power level is greater the third power level;
   determining, by the AP, a first number of antennas to deliver the second power level; and
   determining, by the AP, a second number of antennas to deliver the third power level.

2. The method of claim 1, wherein a first difference between the second power level and the third power level is based on a second difference between a first MCS level associated with the first link and a second MCS level associated with the second link.

3. The method of claim 2, wherein the first MCS level is higher than the second MCS level.

4. The method of claim 1, wherein the first power level is determined by equally dividing a maximum allowed Equivalent Isotropically Radiated Power (EIRP) power level between the first link and the second link.

5. The method of claim 1, further comprising:
   determining, by the AP, a first free space path loss for the first link;
   determining, by the AP, a second free space path loss for the second link; and
   determining, by the AP, the second power level and the third power level to make the first free space path loss equal the second free space path loss.

6. The method of claim 1, wherein the first number of antennas is greater than the second number of antennas.

7. The method of claim 6, further comprising: minimizing a number of overlapped antennas.

8. The method of claim 7, further comprising:
   receiving, by the AP, a request for band aggregation;
   receiving, by the AP, acknowledgement of multi-radio client architecture; and
   triggering, by the AP, establishment of synchronous downlink multi-link operations in the sub-band.

9. A system comprising:
   a memory storage; and
   a processing unit coupled to the memory storage, wherein the processing unit is operative to:
   establish synchronous downlink multi-link operations with a first link that operates in a sub-band and a second link that operates in the sub-band;
   determine a first power level for both the first link and second link;
   determine a second power level for the first link and a third power level for the second link, wherein the second power level is greater than the third power level;
   provide the second power level for the first link and the third power level for the second link;
   determine a first free space path loss for the first link;
   determine a second free space path loss for the second link; and
   determine the second power level and the third power level to make the first free space path loss equal the second free space path loss;

determine that a first client, in communication over the first link, is more distant from the AP than a second client, in communication over the second link; and based on the determination that the first client is more distant, determine that the second power level is greater the third power level.

10. The system of claim 9, wherein the first power level is determined by equally dividing a maximum allowed Equivalent Isotropically Radiated Power (EIRP) power level between the first link and the second link and reducing the equally divided EIRP power level by 3 dB.

11. The system of claim 9, wherein a first difference between the second power level and the third power level is based on a second difference between a first MCS level associated with the first link and a second MCS level associated with the second link, wherein the first MCS level is higher than the second MCS level.

12. A non-transitory computer-readable medium that stores a set of instructions which when executed perform a method executed by the set of instructions comprising:

establishing synchronous downlink multi-link operations with a first link that operates in a sub-band and a second link that operates in the sub-band;

determining a first power level for both the first link and second link;

determining a second power level for the first link and a third power level for the second link, wherein the second power level is greater than the third power level;

allotting the second power level for the first link and the third power level for the second link;

determining, by the AP, a first number of antennas to deliver the second power level; and determining, by the AP, a second number of antennas to deliver the third power level.

13. The non-transitory computer-readable medium of claim 12, wherein the first power level is determined by equally dividing a maximum allowed Equivalent Isotropically Radiated Power (EIRP) power level between the first link and the second link.

14. The non-transitory computer-readable medium of claim 12, wherein a first difference between the second power level and the third power level is based on a second difference between a first MCS level associated with the first link and a second MCS level associated with the second link.

15. The non-transitory computer-readable medium of claim 12, the method further comprising:

determining a first free space path loss for the first link;

determining a second free space path loss for the second link; and determining the second power level and the third power level to make the first free space path loss equal the second free space path loss.

* * * * *